(12) United States Patent
Daneau et al.

(10) Patent No.: US 7,881,853 B2
(45) Date of Patent: Feb. 1, 2011

(54) METHOD FOR WORKING OUT A TEMPERATURE INSTRUCTION CARTOGRAPHY AT ENTRY INTO A PARTICLE FILTER

(75) Inventors: Marc Daneau, Chenove (FR); Adrien Pillot, Rueil-Malmaison (FR)

(73) Assignee: Renault s.a.s, Boulogne Billancourt (FR)

( * ) Notice: Subject to any disclaimer, the term of this patent is extended or adjusted under 35 U.S.C. 154(b) by 540 days.

(21) Appl. No.: 11/577,924

(22) PCT Filed: Oct. 20, 2005

(86) PCT No.: PCT/FR2005/050875

§ 371 (c)(1),
(2), (4) Date: Jun. 10, 2008

(87) PCT Pub. No.: WO2006/045973

PCT Pub. Date: May 4, 2006

(65) Prior Publication Data

US 2009/0182479 A1    Jul. 16, 2009

(30) Foreign Application Priority Data

Oct. 25, 2004 (FR) .................................. 04 52428

(51) Int. Cl.
*G06F 19/00* (2006.01)
*F01N 3/10* (2006.01)
*F01N 3/023* (2006.01)

(52) U.S. Cl. .................... 701/103; 701/115; 60/274; 60/285; 60/295; 60/297; 60/311

(58) Field of Classification Search ......... 701/101–103, 701/115; 60/274, 276, 277, 284, 285, 286, 60/295, 297, 299–301, 303, 311
See application file for complete search history.

(56) References Cited

U.S. PATENT DOCUMENTS

| 6,490,857 | B2 * | 12/2002 | Sasaki ........................ 60/278 |
| 6,634,170 | B2 * | 10/2003 | Hiranuma et al. ............. 60/295 |
| 6,666,020 | B2 * | 12/2003 | Tonetti et al. ................. 60/286 |
| 6,931,842 | B2 * | 8/2005 | Ohtake et al. ................. 60/295 |
| 6,990,803 | B2 * | 1/2006 | Koga et al. .................... 60/295 |
| 7,140,176 | B2 * | 11/2006 | Bartsch et al. ................ 60/276 |
| 7,340,886 | B2 * | 3/2008 | Kawashima et al. .......... 60/295 |
| 7,543,445 | B2 * | 6/2009 | Bardasz ....................... 60/295 |

FOREIGN PATENT DOCUMENTS

| EP | 1 245 814 | 10/2002 |
| EP | 1 426 591 | 6/2004 |
| EP | 1 464 817 | 10/2004 |
| EP | 1 517 026 | 3/2005 |
| WO | 0227162 | 4/2002 |

* cited by examiner

*Primary Examiner*—Willis R Wolfe, Jr.
(74) *Attorney, Agent, or Firm*—Oblon, Spivak, McClelland, Maier & Neustadt, L.L.P.

(57) ABSTRACT

A method for working out instruction cartography for a temperature at entry into a filter. The method determines for each combination, which includes a soot mass in a particle filter, a temperature at the filter output, an air flowrate through the filter and a soot combustion rate in the filter and is associated with a time t, a value assignable to the instruction, wherein the value is selected such that the filter output temperature remains less than a maximum permissible temperature after a pedal release at a time L.

7 Claims, 2 Drawing Sheets

METHOD FOR WORKING OUT A TEMPERATURE INSTRUCTION CARTOGRAPHY AT ENTRY INTO A PARTICLE FILTER

TECHNICAL FIELD

The present invention relates in general to the field of regeneration of a particulate filter disposed in an exhaust circuit associated with a diesel engine for a motor vehicle.

More precisely, the invention relates to a method for constructing a map of temperature settings at the particulate-filter inlet, this map being intended to make the setting vary during a given regeneration as a function of inputs containing real-time information on the condition of the particulate filter.

Moreover, the present invention also relates to such a map intended to be installed in a control unit of a diesel engine, a motor vehicle equipped with a control unit in which this map is installed and a method for controlling a regeneration process implemented by means of this same map.

STATE OF THE PRIOR ART

In the prior art, the construction of the temperature setting at the particulate-filter inlet is usually achieved experimentally by regeneration tests. For this purpose, a regeneration process is initiated and a return to idling is provoked, using a diesel engine and a particulate filter laden with soot to a value at which regeneration would be triggered.

It is then ensured that the temperature at the particulate-filter outlet does not exceed a maximum permissible temperature beyond which the particulate filter is susceptible to deterioration.

If this is exceeded, one or more tests is or are then conducted with lower values of the temperature setting at the particulate-filter inlet, until the temperature measured at the particulate-filter outlet during the return to idling is lower than the aforesaid maximum permissible temperature.

It is understood that this manipulation is repeated until the range of operation of the engine has been completely covered.

Although this technique of constructing the temperature setting at the particulate-filter inlet makes it possible to limit the risks of destruction of this filter due to racing during regeneration, it nevertheless presents a major inconvenience.

In fact, the construction described in the foregoing culminates in obtaining a setting of fixed value, which will be applied throughout the entire regeneration process, thus making it impossible to maximize the regeneration rate at each instant of this same regeneration process.

Thus the prolonged and non-optimized duration of these periodic regeneration phases, obtained by raising the exhaust-gas temperature in known manner, may have non-negligible detrimental effects in terms of degradation of the physico-chemical properties of the lubricating oil of the engine, of mechanical fatigue of the turbine or even of exhaustion of the oxidation function of the oxidation catalyst.

EXPLANATION OF THE INVENTION

The objective of the invention is therefore to propose a method for constructing a map of temperature settings at the particulate-filter inlet, this map being intended to permit, as a function of the condition of the particulate filter, modifying the value of the setting during a given regeneration phase, for the purpose of maximizing and optimizing the regeneration rate while avoiding the risks of deterioration of this particulate filter.

To achieve this, the invention has as its object a method for constructing a map of temperature settings at the particulate-filter inlet, the map being intended to be installed in a control unit of a diesel engine for a motor vehicle provided with an exhaust circuit in which there is disposed a particulate filter capable of being regenerated by combustion of the soot present within this same filter, the regeneration being provoked by elevation of the exhaust-gas temperature at the particulate-filter inlet, the said elevation being a function of the temperature setting at the particulate-filter inlet.

According to the invention, the construction method includes a step which, for each combination associated with an instant t of regeneration and belonging to a set of combinations (a) of a mass of soot within the particulate filter;
(b) of a temperature at the outlet of the particulate filter;
(c) of an air flow through the particulate filter; and
(d) of a rate of combustion of the soot within the particulate filter;

consists in determining the value to be assigned to the temperature setting at the particulate-filter inlet, this value being searched for in such a way that, after initiation of a pedal release at the instant t and regardless of the pedal-release profile chosen from among a set of pedal-release profiles, the temperature at the particulate-filter outlet remains below a maximum permissible temperature beyond which the particulate filter is susceptible to deterioration.

It must therefore be understood that the map obtained in this way makes it possible, during the use thereof, to modify the value of the temperature setting at the particulate-filter inlet during a given regeneration phase as a function of the aforesaid four inputs/parameters relative to the condition of the particulate filter in real time.

As a consequence, the regeneration rate can thus be optimized and maximized, implying that the risks inherent to prior art embodiments due to degradation of the physico-chemical properties of the lubricating oil of the engine, the mechanical fatigue of the turbine or even the exhaustion of the oxidation function of the oxidation catalyst are advantageously largely diminished.

In addition, since experience shows that it is during pedal releases, whether or not they are followed by returns to idling, that the risk of racing is greatest, the step of determining, for each combination, the value to be assigned to the temperature setting at the particulate-filter inlet has therefore been dictated by this constraint. In this context, it is noted that the method according to the invention, taking into account the constraints related to each of the pedal-release profiles belonging to a set of pedal-release profiles, preferably ranging from an abrupt stop to prolonged pedal release during a downhill stretch while effecting a gear change, the risks of racing and/or of destruction of the particulate filter during the phases of pedal release and/or return to idling are reduced to almost nothing in this way.

In other words, with such a map, at any instant t of regeneration, the temperature setting at the particulate-filter inlet is advantageously adapted in such a way that, if a pedal release of the worst kind occurs precisely at this instant t, the particulate filter will not be subjected to any racing and will therefore be able to maintain its integrity with certainty.

Moreover, the invention also has as an object a map of the temperature settings at the particulate-filter inlet, this map being intended to be installed in a control unit of a diesel engine for a motor vehicle provided with an exhaust circuit in which there is disposed a particulate filter capable of being regenerated by combustion of the soot present within this same filter, the regeneration being provoked by elevation of the exhaust-gas temperature at the particulate-filter inlet, the said elevation being a function of the temperature setting at the particulate-filter inlet. According to the invention, this map is composed of four inputs corresponding respectively to:

(a) a mass of soot within the particulate filter;
(b) a temperature at the outlet of the particulate filter;
(c) an air flow through the particulate filter; and
(d) a rate of combustion of the soot within the particulate filter.

In addition, it is provided with an output corresponding to the temperature setting at the particulate-filter inlet.

Furthermore, this map, designed so as to permit variation of the value of the temperature setting at the particulate-filter inlet during regeneration, is constructed by a method such as that presented hereinabove.

The invention also has as an object a motor vehicle comprising a diesel engine, an exhaust circuit equipped with a particulate filter and an engine control unit in which there is installed a map of temperature settings at the particulate-filter inlet, such as that just described.

Finally, the present invention has as an object a method for controlling regeneration of a particulate filter disposed in an exhaust circuit of a diesel engine for a motor vehicle, this method being implemented by means of a map of temperature settings at the particulate-filter inlet, such as that just described.

Other advantages and characteristics of the invention will become apparent in the detailed, non-limitative description hereinafter.

BRIEF DESCRIPTION OF THE DRAWINGS

This description will be written with reference to the attached drawings, among which.

DETAILED DESCRIPTION OF PREFERRED EMBODIMENTS

Figure 1:
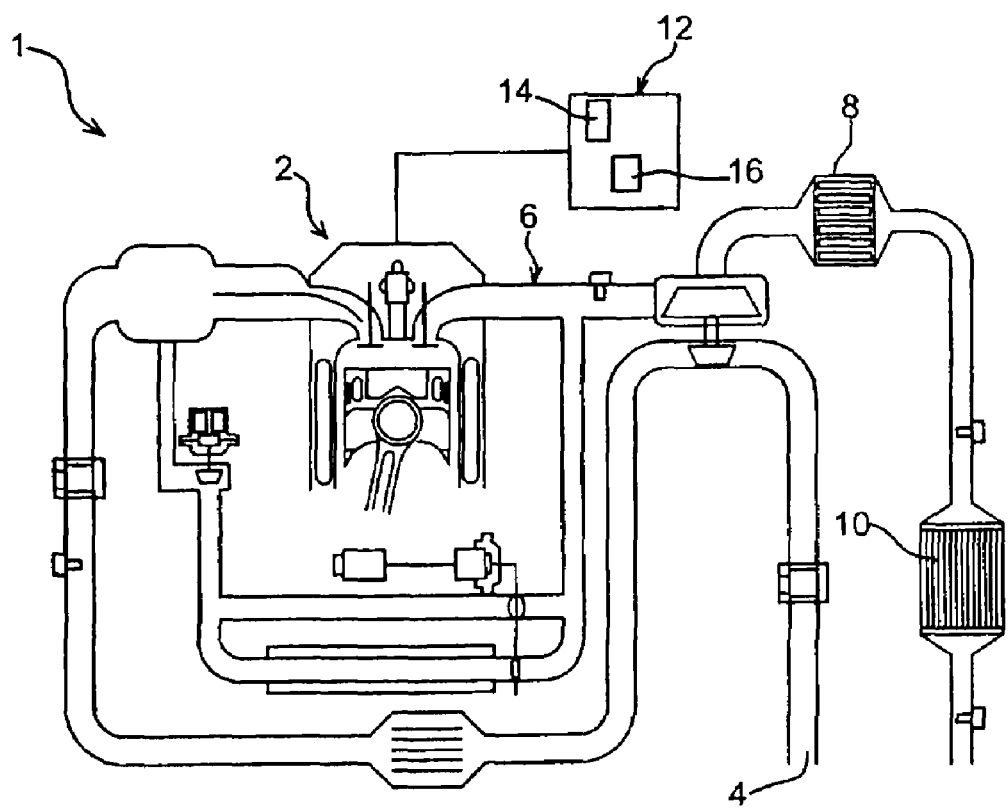
FIG. 1 represents a schematic view of a diesel-engine assembly for a motor vehicle, this engine assembly having a control unit equipped with a map of temperature settings at the particulate filter inlet, according to a preferred embodiment of the present invention.

Referring firstly to FIG. 1, there can be seen an engine assembly 1 for a motor vehicle, this assembly 1 comprising overall a diesel engine 2, an air intake 4 and an exhaust circuit 6 equipped with an oxidation catalyst 8 and a traditional or catalytic particulate filter 10. In addition, assembly 1 is provided with a control unit 12 for diesel engine 2, this control unit having traditional means 14 that are known to those skilled in the art, as well as a map 16 of temperature settings at the particulate-filter inlet, this setting being denoted as TEFAP setting in the rest of the description.

During regeneration of filter 10 triggered by detection of an excessive soot mass in the interior of this same filter 10, the value of the applied TEFAP setting has a direct influence on the extent of heating of the exhaust gases, this heating causing elimination of the soot by combustion being achieved, furthermore, by any one of the traditional techniques, such as retarding the main fuel injection, increasing the advanced post-injection flow or even increasing the retarded post-injection flow.

Figure 2:
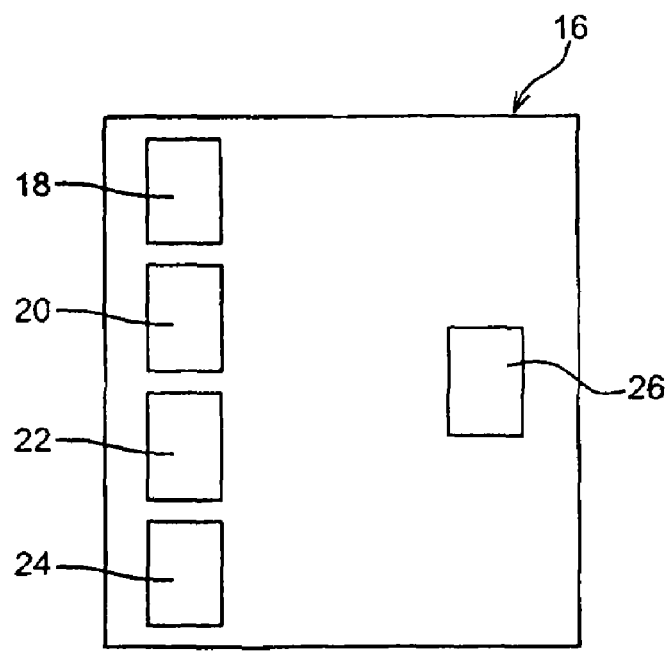
FIG. 2 represents an enlarged schematic view of the map shown in FIG. 1.

More precisely, with reference to FIG. 2, map 16 has four inputs 18, 20, 22, 24 and one output 26 corresponding to the TEFAP setting, which can therefore vary during a given regeneration as a function of the value of the four inputs. Naturally, it is noted that this map 16 is utilized only during the regenerations of filter 10 and not during the normal operating phases of engine 2, in which a specific command relating to elevation of the exhaust-gas temperature is not normally ordered. In addition, as will be explained in detail hereinafter, map 16 is designed in such a way that a predetermined value of the TEFAP setting is associated with each possible combination of the four inputs to be presented hereinafter.

Input 18 corresponds to a mass of soot within filter 10, and input 20 corresponds to an outlet temperature of the particulate filter, this temperature being denoted as TSFAP in the rest of the description. By analogy, the temperature at the particulate-filter inlet will be denoted as TEFAP.

In addition, input 22 corresponds to an air flow through filter 10, and input 24 relates to a rate of combustion of the soot within this same filter.

By way of information, it is pointed out that these four parameters were adopted by virtue of the fact that they make it possible to obtain extremely satisfactory information about the condition of filter 10 at any instant t of the regeneration of this filter 10. In addition, they were judiciously chosen following an in-depth analysis of the regeneration operation within a particulate filter, which made it possible to demonstrate the fact that the TSFAP depended on the compromise between the mass of soot burned per unit time (or in other words the combustion rate) and the air flow through this particulate filter. Moreover, this analysis also made it possible to establish that the regeneration rate depended on the oxygen ratio at the filter inlet and on the temperature of this particulate filter, the said temperature corresponding to the TEFAP augmented by the heat released by the combustion of the already eliminated soot.

By way of indication, it is noted that, during regeneration, the values of the four inputs 18, 20, 22, 24, together constituting a given combination with which map 16 makes it possible to associate a predetermined value of the TEFAP setting, are regularly updated in quasi-real time by means of sensors present on engine assembly 1, and/or estimates, possibly in association with one or more calculation modules.

Figure 3:
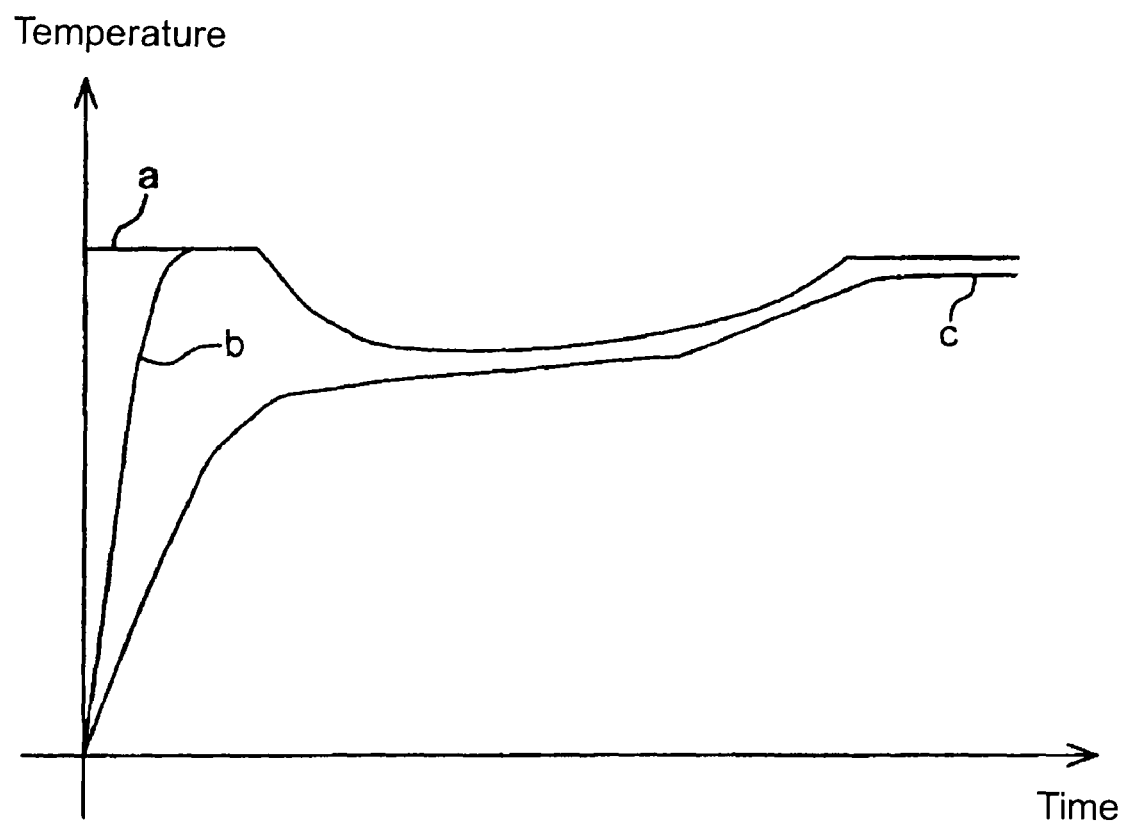
FIG. 3 represents a graph schematically indicating the evolution, in the course of regeneration, of the temperature setting imposed by the map of FIG. 2 at the particulate-filter inlet, of the inlet temperature of the particulate filter and of the outlet temperature of the particulate filter.

Referring to FIG. 3, there can be seen a graph showing the evolution of different temperatures as a function of time during regeneration of filter 10 triggered in traditional manner and then guided by map 16, which is the object of the invention. On this graph, curve a represents the TEFAP setting, curve b the TEFAP and curve c the TSFAP.

As is evident, the TEFAP setting is at its maximum at the start of regeneration, and the real/estimated TEFAP takes some time before attaining the value of this setting, because of the inertia of the system. When the TSFAP has risen significantly, the TEFAP setting begins to drop slightly and, moreover, it is a short time after this instant that the soot begins to burn within filter 10. In this way, after significant combustion of the soot, the TEFAP setting can then rise, until it again attains its maximum value at the end of regeneration.

These curves show in particular that the TEFAP setting delivered by map 16 largely reflects the observations made during construction of the said map, or in other words on the one hand that the further the TSFAP lies below the TEFAP, the more the TEFAP setting can be raised, and on the other hand that the greater the mass of soot becomes, the more the TEFAP setting can also be raised.

There will now be described a method for constructing map 16 of the TEFAP setting associated with filter 10, according to a preferred embodiment of the present invention.

Firstly it is pointed out that this construction method is applied during the development of engine 2, preferably on the basis of a dynamic computerized model of the combustion of soot within filter 10 (this model not being illustrated), this model being capable of calculating the mass of soot within filter 10, the TSFAP and the rate of combustion of soot within filter 10 at each instant during a simulated regeneration, by using data concerning the TEFAP, the mass of soot at a starting instant of regeneration, the air flow through filter 10 and the oxygen ratio at the particulate-filter inlet. The aforesaid data are estimated or obtained directly by means of sensors placed on a test bench comprising engine 2.

In this way, it can be understood that the computerized model is capable, at any instant t of the simulated regeneration, of knowing the value of the four inputs 18, 20, 22, 24 of map 16 to be constructed, these input values together constituting a given combination associated with this instant t.

In addition, this computerized model, whose contents are adapted to the specific model of the particulate filter adopted to be installed later in association with engine 2, therefore advantageously makes it possible to construct map 16 by performing tests by means of this same engine 2, without the particulate filter in question having to be physically present on the test bench.

Thus, for a given combination associated with an instant t of regeneration, the value to be assigned to the TEFAP setting is determined by experimentation, this value being searched for in such a way that, after initiation of a pedal release at instant t, the TSFAP remains below a maximum permissible temperature beyond which filter 10 is susceptible to deterioration, and this is the case during the entire period of pedal release operated in controlled manner. Of course, in the present case, the pedal release is manifested by the application of a specific command adapted to engine 2 of the test bench.

For one and the same combination, the value to be assigned to the TEFAP setting is searched for by performing tests for all pedal-release profiles belonging to a set of pedal-release profiles, this set preferably covering all the cases from abrupt stop to prolonged pedal release during downhill travel, while effecting a gear change.

In this regard, it is noted that the set of pedal-release profiles is established experimentally or by simulation, by means of parameters that vary as a function of time, which parameters are the TEFAP, the air flow through filter 10 and the oxygen ratio at the particulate-filter inlet.

By way of indication, for a given initial value of TEFAP, the manner in which it evolves during pedal release is related to, among other factors, the air flow, the thermal inertia of upstream elements such as the exhaust pipe and oxidation catalyst 8, and also the vehicle speed, which influences the cooling of these same elements. On the other hand, for a given value of initial air flow, the manner in which it evolves is related to, among other factors, the speed to which the vehicle slows and to the engine filling ratio. Finally, for the oxygen ratio, the variations are quasi-instantaneous, and, a priori, the ratio is maintained at 21% during the pedal release.

Of course, to maximize the rate of regeneration of filter 10, the value adopted for the TEFAP setting is preferably the maximum value that satisfies the condition on the TSFAP after the instant at which fuel injection is cut off, corresponding to the instant t of initiation of pedal release, and this is the case for all envisioned pedal-release profiles.

In addition, for construction of map 16, a value of the TEFAP setting must be determined for each combination belonging to a set of combinations that preferably covers the entirety of the variation space.

It is advantageous to automate all these tasks by a computer program, which will therefore make it possible ultimately to assign a precise value of the TEFAP setting to each possible combination, without the risk that this value will later cause, during operation of engine assembly 1 equipped with this map 16, racing of regeneration, and this will be the case even when the driver decides to perform two successive pedal releases during the same regeneration but accelerates once again between the said releases.

Of course, those skilled in the art will be able to make various modifications to the method of constructing map 16 and to this same map 16 that have just been described, solely by way of non-limitative examples.

The invention claimed is:

1. A method for constructing a map of temperature settings at a particulate-filter inlet, the map configured to be installed in a control unit of a diesel engine for a motor vehicle including an exhaust circuit in which is disposed a particulate filter configured to be regenerated by combustion of soot present within the filter, the regeneration being provoked by elevation of exhaust-gas temperature at the inlet of the particulate filter, the elevation being a function of the temperature setting at the particulate-filter inlet, the method comprising, for each combination associated with an instant t of regeneration and belonging to a set of combinations:
(a) of a mass of soot within the particulate filter;
(b) of a temperature at the outlet of the particulate filter;
(c) of an air flow through the particulate filter; and
(d) of a rate of combustion of the soot within the particulate filter;
determining a value to be assigned to the temperature setting at the particulate-filter inlet, the value being searched for such that, after initiation of a pedal release at the instant t and regardless of a pedal-release profile chosen from among a set of pedal-release profiles, the temperature at the particulate-filter outlet remains below a maximum permissible temperature beyond which the particulate filter is susceptible to deterioration.

2. A method according to claim 1, implemented based on a dynamic computerized model of the combustion of soot within the particulate filter, the model capable of calculating the mass of soot within the particulate filter, the temperature at the particulate-filter outlet, and the rate of combustion of soot within the particulate filter at each instant during a regeneration, by using data concerning the temperature at the particulate-filter inlet, the mass of soot at a starting instant of the regeneration, the air flow through the particulate filter, and the oxygen ratio at the inlet of the particulate filter.

3. A method according to claim 1, wherein the set of pedal-release profiles is established experimentally or by simulation, by the following parameters, which vary as a function of time:
the particulate-filter inlet temperature;
the air flow through the particulate filter; and
the oxygen ratio at the inlet of the particulate filter.

4. A map of temperature settings at a particulate-filter inlet, the map configured to be installed in a control unit of a diesel engine for a motor vehicle including an exhaust circuit in which is disposed a particulate filter configured to be regenerated by combustion of soot present within the filter, the regeneration being provoked by elevation of the exhaust-gas temperature at the inlet of the particulate filter, the elevation being a function of the temperature setting at the inlet of the particulate filter, composed of four inputs corresponding respectively to:
(a) a mass of soot within the particulate filter;
(b) a temperature at the outlet of the particulate filter;
(c) an air flow through the particulate filter; and
(d) a rate of combustion of the soot within the particulate filter,
and including an output corresponding to the temperature setting at the inlet of the particulate filter.

5. A map according to claim 4, the map configured to permit variation of the value of the temperature setting at the inlet of the particulate filter during the regeneration.

6. A motor vehicle comprising:
a diesel engine;
an exhaust circuit including a particulate filter and a control unit of the engine, in which unit there is installed a map of temperature settings at the particulate-filter inlet, wherein the map is a map according to claim 4.

7. A method for controlling regeneration of a particulate filter disposed in an exhaust circuit of a diesel engine for a motor vehicle, implemented by a map of temperature settings at the inlet of the particulate filter according to claim 4.

* * * * *